June 2, 1959   J. T. BARRON   2,888,946
DIAPHRAGM RELIEF VALVE
Filed Aug. 3, 1956

United States Patent Office 2,888,946
Patented June 2, 1959

2,888,946

DIAPHRAGM RELIEF VALVE

John T. Barron, Willow Grove, Pa., assignor to Milton Roy Company, Philadelphia, Pa., a corporation of Pennsylvania Application August 3, 1956, Serial No. 601,985

7 Claims. (Cl. 137—469)

This invention relates to a valve of the diaphragm operated type and has for an object the provision of a diaphragm relief valve having a construction which permits close regulation of the valve and increased valve capacity without increasing the size of port openings.

In accordance with the invention there is utilized a flexible diaphragm having a shroud depending therefrom within which the check means of the valve is adapted to be received. The check means, which may be in the form of a ball, is so shaped to hold the shroud away from the valve seat a predetermined distance when the valve is in closed position and to guide the fluid into the shroud where it will engage a surface of the diaphragm having an area greater than the area of the inlet port so as to distribute the fluid pressure over a larger area thus increasing the effective pressure for overcoming the biasing force of the valve immediately after the inlet pressure raises the ball off its seat. By so relating the length and internal diameter of the shroud to the diameter of the ball so that the shroud is spaced from the ball seat when the valve is in closed position, this insures there will be a greater spacing between the shroud and the valve seat when the valve is in open position with the ball raised off its seat thus obtaining an increase in the flow capacity of the valve due to a full lift of the diaphragm means. The shroud and diaphragm means are formed integral thus providing simple construction but with improved valve operation.

Figure 1:
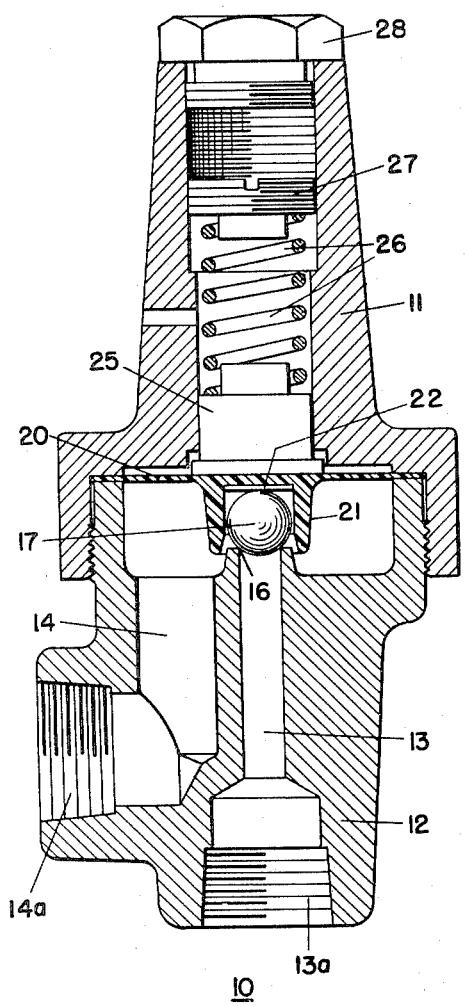
Figure 2:
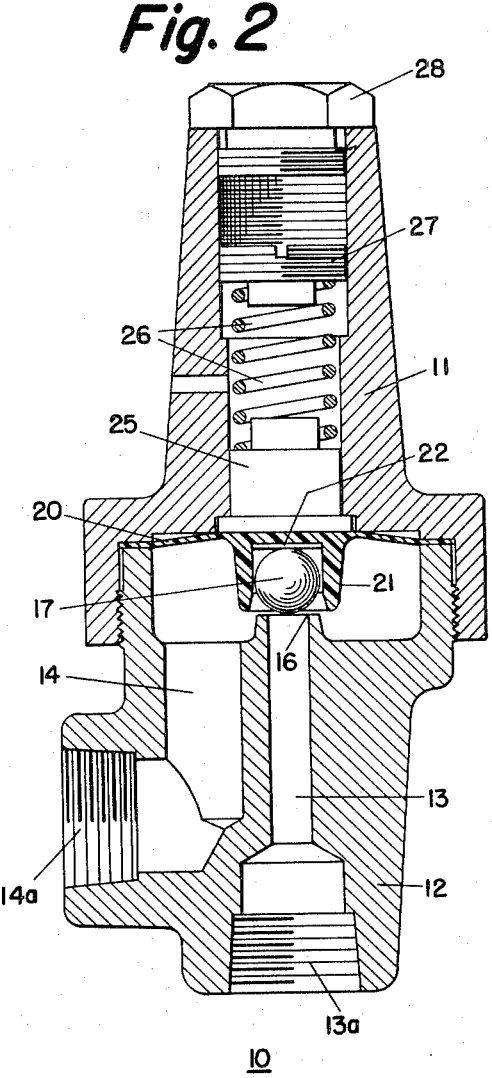

For a more detailed disclosure of the invention and for further objects and advantages thereof, reference is to be had to the following description taken into conjunction with the accompanying drawing in which:

Fig. 1 is a sectional view through the valve showing the parts in closed position; and Fig. 2 is a view similar to Fig. 1, showing the valve in open position.

Referring to Fig. 1 the valve 10 includes a casing comprising an upper body member 11 adapted to be threadedly connected to a lower body member 12. The lower body member is provided with an inlet port or passage 13 and an outlet port or passage 14. These ports may be suitably connected with external piping as at connections 13a and 14a respectively. On the seat 16 in inlet port 13 there is disposed check means illustrated as a ball member 17. The diameter of the ball 17 is greater than the diameter of the seat 16, the diameter of the latter being preferably about 75% of the diameter of the ball although the present invention is not limited to this specific relationship.

A flexible diaphragm 20 is adapted to be held about its periphery between the body members 11 and 12. Depending from the lower surface of diaphragm 20 is a shroud 21 which is formed integral with the diaphragm 20. The diaphragm 20 and the shroud 21 are formed from the same material and preferably are molded from a fluorocarbon resin. Examples of such resin are polymers of tetrafluoroethylene sold under the trademark "Teflon" and polymers of chlorotrifluoroethylene sold under the trademark "Kel-F." As may be seen in Fig. 1, the internal diameter of the shroud 21 is greater than the diameter of the ball check 17. The length and internal diameter of the shroud 21 are so related to the diameter of the ball 17 that the shroud 21 is spaced from the circumference or periphery of the ball seat 16 a predetermined distance by the ball when the ball is on the seat and the valve is in closed position. A ball limit disc 22 is disposed against the diaphragm 20 within the shroud 21 and is adapted to engage the upper surface of the ball 17 when the ball is in position shown in Fig. 1. The ball limit disc 22 is formed from a harder material than the diaphragm, and thus prevents the ball from making an indentation in the relatively soft material from which the diaphragm is former. This prevents the predetermined spacing between the lower end of the shroud 21 and the ball seat 16 from being varied due to penetration of the ball into the opposed portion of the diaphragm 20.

The ball 17 is adapted to be held in position on its seat 16 in closing port 13 by means of biasing means illustrated as a pressure member 25 and a compression spring 26 both disposed within the upper body member 11. An adjusting screw 27 is adapted threadedly to engage the opening extending through the upper body member 11 and by varying the compression on spring 26 the pressure setting of the valve 10 may be adjusted. A cap screw 28 is inserted in the upper end of body member 11 to close that end of the opening.

In operation of the valve 10 when the passage 13 on the inlet side of the valve comes to the pressure per square inch corresponding to the set pressure of the valve, the force or pressure of spring 26 will be overbalanced. When this occurs the ball 17 moves off the seat 16 thus permitting the fluid from the inlet port 13 to pass around the curved surface of the ball and be guided into the area at the upper end of the shroud adjacent the ball limit disc 22. By reason of the shroud 21 holding the ball 16 in position and having close clearance between the seat 16 and the inside tapered dimension of shroud 21, there is built up a back pressure which is effective on an area greater than the area of the inlet port 13, namely an area having the same diameter as the ball limit disc 22. Thus substantially immediately the inlet pressure is operating on a larger diameter of the diaphragm which causes the diaphragm 20 to assume a full lift, Fig. 2, since the effective force for overcoming the biasing force of the spring 26 has now been substantially increased.

In general, the capacity of a relief valve may be defined by the amount of liquid that will pass through the valve at a 25% increase in pressure over the set pressure of the valve. The novel construction of the present invention has the advantage of providing very close regulation between the set pressure and the pressure which gives full ball lift and large flow capacity. In fact, this construction provides a larger valve capacity for the same size port openings than other valves currently available on the market.

While there has been described a preferred embodiment of the invention, it will be understood that further modification may be made without departing from the spirit and scope of the invention as set forth in the appended claims.

What is claimed is:

1. In a diaphragm relief valve including a casing having inlet and outlet ports, the improvement of means for increasing the valve capacity for a given size port opening comprising a seat in said inlet port, check means disposed on said seat and having a diameter greater than the diameter of said inlet port, flexible diaphragm means disposed within said casing, means for applying a biasing force to said diaphragm means to hold said check means on said seat at pressures below a predetermined pressure, and shroud means depending from said diaphragm means and surrounding said check means, said shroud means having an internal diameter greater than said check means, the length and internal diameter of said shroud being so related to the diameter of said check means that said shroud is spaced from the periphery of said seat a predetermined distance by said check means when said check means is on said seat to obtain an increase in the effective force for overcoming said biasing force immediately after the inlet pressure raises the check means off its seat and to obtain an increase in the flow capacity of said valve due to a full lift of said diaphragm means.

2. In a diaphragm relief valve according to claim 1 wherein said check means has a surface shaped to guide the fluid from the inlet port into said shroud immediately following the initial opening of said valve.

3. In a diaphragm relief valve according to claim 2 wherein said check means comprises a ball member.

4. In a diaphragm relief valve according to claim 1 wherein said flexible diaphragm means and said shroud are integral and formed from the same material.

5. In a diaphragm relief valve according to claim 4 wherein said flexible diaphragm means and said shroud are formed from a fluorocarbon resin.

6. In a diaphragm relief valve including a casing having inlet and outlet ports, the improvement of means for increasing the valve capacity for a given size port opening comprising a ball seat in said inlet port, a ball disposed on said ball seat and having a diameter greater than the diameter of said inlet port, flexible diaphragm means disposed within said casing, means for applying a biasing force to said diaphragm means to hold said ball on said seat at pressures below a predetermined pressure, shroud means depending from said diaphragm means and surrounding said ball, and a ball limit disc disposed within said shroud between said ball and said flexible diaphragm means, said shroud means having an internal diameter greater than said ball, the length and internal diameter of said shroud being so related to the diameter of said ball that said shroud is spaced from the periphery of said ball seat a predetermined distance by said ball when said ball is on said seat closing said inlet port to obtain an increase in the effective force for overcoming said biasing force immediately after the inlet pressure raises the ball off its seat and to obtain an increase in the flow capacity of said valve due to a full lift of said diaphragm means.

7. In a diaphragm relief valve including a casing having inlet and outlet ports, the improvement of means for increasing the valve capacity for a given size port opening comprising a seat in said inlet port, check means disposed on said seat and having a diameter greater than the diameter of said inlet port, flexible diaphragm means disposed within said casing, shroud means depending from said diaphragm means and surrounding said check means, a wear-resistant surface on said diaphragm means within said shroud for engaging said check means, and means for applying a biasing force to said diaphragm means to hold said wear-resistant surface in engagement with said check means and to hold said check means on said seat at pressures below a predetermined pressure, said shroud means having an internal diameter greater than said check means, the length and internal diameter of said shroud being so related to the diameter of said check means that said shroud is spaced from the periphery of said seat a predetermined distance by said check means when said check means is on said seat to obtain an increase in the effective force for overcoming said biasing force immediately after the inlet pressure raises the check means off its seat and to obtain an increase in the flow capacity of said valve due to a full lift of said diaphragm means, said wear-resistant surface being of a harder material than said diaphragm means to prevent said check means from making an indentation in said diaphragm means and thereby prevent the spacing between said shroud and said seat from being varied from said predetermined distance due to penetration of said check means into said diaphragm means.

References Cited in the file of this patent

UNITED STATES PATENTS

| | | |
|---|---|---|
| 1,939,911 | McCune | Dec. 19, 1933 |
| 2,585,575 | Nedergaard | Feb. 12, 1952 |
| 2,758,609 | Dickert | Aug. 14, 1956 |